E. SMITH.
Saw Set.
No. 52,218.
Patented Jan'y 23, 1866.
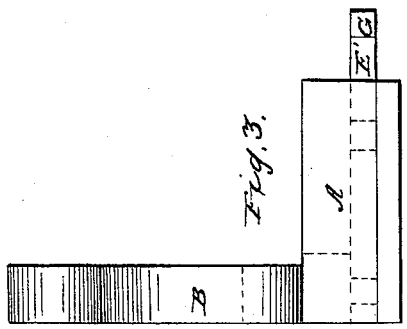
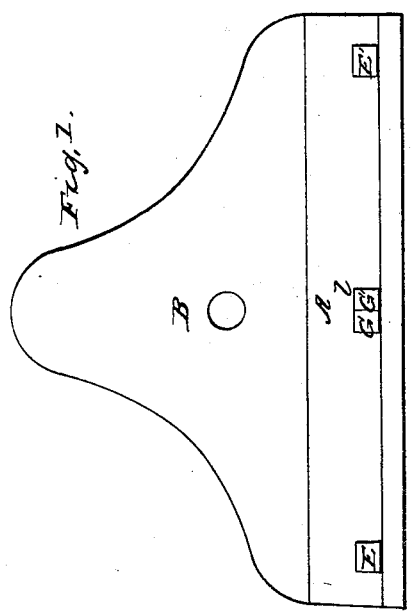
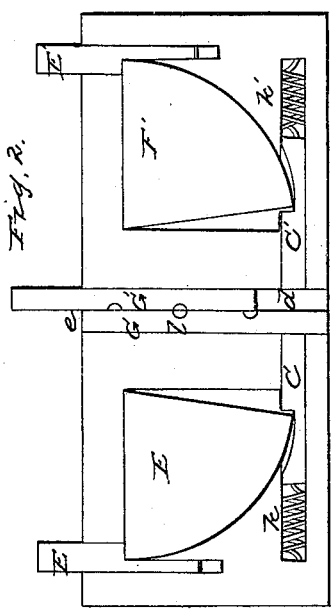
Witnesses
S. R. Stocker
John T. Freeman
Inventor:
E. C. Smith

UNITED STATES PATENT OFFICE.

ELI SMITH, OF WINDSOR, VERMONT.

SAW-SET.

Specification forming part of Letters Patent No. 52,218, dated January 23, 1866.

*To all whom it may concern:*

Be it known that I, ELI SMITH, of Windsor, county of Windsor, State of Vermont, have invented an Improved Saw-Set; and I do hereby declare that the following is a full and exact description thereof, reference being had to the accompanying drawings, and to letters of reference marked thereon.

In the drawings, Figure 1 is a plan view of my invention; Fig. 2, a front view with the plate $c$ removed, showing its internal arrangement; and Fig. 3 is an end view.

The object of this invention is to obtain a saw-set that can be applied to circular saws in such a manner that they can be accurately set without unhanging them or removing them from their arbors. To accomplish this I have arranged the mechanism constituting this invention in the manner which I will now describe.

I make the frame or box A, which incloses the working parts. This frame or case A has a foot or projection, B, which extends out from it for the purpose of firmly securing the same to the saw-bench. In this frame are the sets or punches C C′, one on each side of the slot $d$, in which the saw is placed. These sets have a horizontal motion, produced from the vertical movement of the piece E or E′ by means of the sector-shaped piece F F′, so that a blow struck on E is transferred to the saw at $d$. The pieces G G′ slide in the groove $d\,e$, and are held in position by the pin $l$, for the purpose hereinafter described.

The operation is as follows: The machine being placed over the saw, so that it projects up into the groove $d$, and firmly secured by being bolted or screwed down to the saw-bench, one of the pieces, G G′, is slid down so as to form a backing for the saw, and the teeth are set out one at a time, as in the common method, every other tooth being set out on either side by means of a blow struck on the piece E, transferred to the punch C in the manner described. This being done, and all the teeth set out on one side that are required, the piece G is slid up and G′ pushed down, and a similar operation gone through with on the remaining teeth on the other side.

The principal advantage, which is apparent from the foregoing description, is that the saw can be set without being removed from its place, while at the same time each tooth is set out just as much as every other, thus causing the saw to run true and enabling the operator to work much more accurately than when set by the common method.

Now, having described my invention, what I claim as new, and desire to secure by Letters Patent, is—

The combination of the pieces C or C′, F or F′, E or E′, and G or G′ with a suitable frame or case, B, substantially in the manner and for the purpose described.

ELI SMITH.

Witnesses:
   S. R. STOCKER,
   JOHN T. FREEMAN.